United States Patent [19]

Culbertson

[11] Patent Number: 5,618,109
[45] Date of Patent: *Apr. 8, 1997

[54] SURFACE TEMPERATURE PROBE WITH UNIFORM THERMOCOUPLE JUNCTION AND OVERTRAVEL PROTECTION

[75] Inventor: David P. Culbertson, Bristol, Wis.

[73] Assignee: Claud S. Gordon Company, Richmond, Ill.

[ * ] Notice: The term of this patent shall not extend beyond the expiration date of Pat. No. 5,370,459.

[21] Appl. No.: 349,483

[22] Filed: Dec. 2, 1994

Related U.S. Application Data

[63] Continuation-in-part of Ser. No. 73,850, Jun. 8, 1993, Pat. No. 5,370,459.

[51] Int. Cl.$^6$ ............................. G01K 1/14; G01K 7/04
[52] U.S. Cl. ..................... 374/179; 374/208; 136/221; 136/230; 136/201
[58] Field of Search ............................. 374/208, 179; 136/221, 229, 230, 201

[56] References Cited

U.S. PATENT DOCUMENTS

| | | | |
|---|---|---|---|
| 3,395,050 | 7/1968 | Senbokuya | 136/221 |
| 3,573,995 | 4/1971 | Senbokuya | 136/221 |
| 3,751,305 | 8/1973 | Huebscher | 136/221 |
| 4,091,673 | 5/1978 | Tamura et al. | 73/351 |
| 4,241,289 | 12/1980 | Bowling | 219/450 |
| 4,242,148 | 12/1980 | Remmert | 136/221 |
| 4,265,117 | 5/1981 | Thoma et al. | 73/359 R |
| 4,279,154 | 7/1981 | Nakamura | 73/359 R |
| 4,355,911 | 10/1982 | Tymkewicz | 374/165 |
| 4,614,443 | 9/1986 | Hamert | 374/163 |
| 4,674,555 | 6/1987 | Plata | 164/150 |
| 4,729,798 | 3/1988 | Nanigian | 136/221 |
| 4,808,241 | 2/1989 | Hollander et al. | 136/230 |
| 4,859,081 | 8/1989 | Kabayashi | 374/179 |
| 4,963,195 | 10/1990 | Kodato et al. | 136/225 |
| 5,176,451 | 1/1993 | Sasada et al. | 374/179 |
| 5,281,793 | 1/1994 | Gavin et al. | 374/208 |
| 5,356,486 | 10/1994 | Sugarman et al. | 374/179 |
| 5,370,459 | 12/1994 | Culbertson et al. | 374/179 |

FOREIGN PATENT DOCUMENTS

| | | |
|---|---|---|
| 4625795 | 7/1971 | Japan . |
| 55-74432 | 6/1980 | Japan . |
| 61-219841 | 9/1986 | Japan . |
| 800692 | 1/1981 | U.S.S.R. . |
| 304556 | 1/1929 | United Kingdom . |
| 527778 | 10/1940 | United Kingdom . |
| 932260 | 7/1963 | United Kingdom . |

OTHER PUBLICATIONS

"Adding a New Page on the History of Surface Temperature Measurement That is Model–N Sensor for Next Century.", Anritsu Meter Co., Ltd., Tokyo, Japan, (date unknown).

"Thermo Electric Catalog", Hand Held Thermocouple Probes, C–15, 1988.

"Surface–Hugging Ribbon Senses Temperature Fast", Design News, Jun. 8, 1992, pp. 133, 134.

"High Specification Thermocouple Probes Model–S", Anritus Meter Co., Ltd., Tokyo, Japan, 1989.

"A Breakthrough in Hand–Held Sensor Technology", Hand Held Thermocouples, Watlow Gordon Catalog, p. 75 (pre 1992).

"Temperature Measurement, Instruments and Probes", Anritsu Meter Co. of America, p. 23, 1989.

*Primary Examiner*—Diego F. F. Gutierrez
*Attorney, Agent, or Firm*—Renner, Otto, Boisselle & Sklar, P.L.L.

[57] ABSTRACT

A contact-type surface temperature probe which has a spring flexure for providing a spring force in relation to a surface to be measured. The spring flexure undergoes deflection when pressed against the surface. The probe also has at least one mechanical stop which limits the amount of travel of the spring flexure.

18 Claims, 4 Drawing Sheets

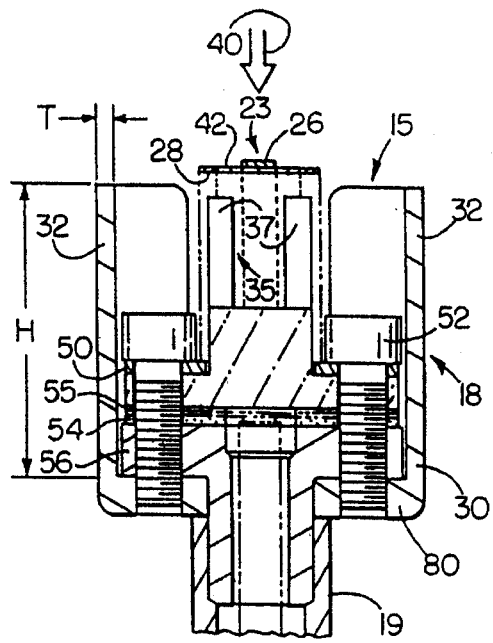
FIG. 3
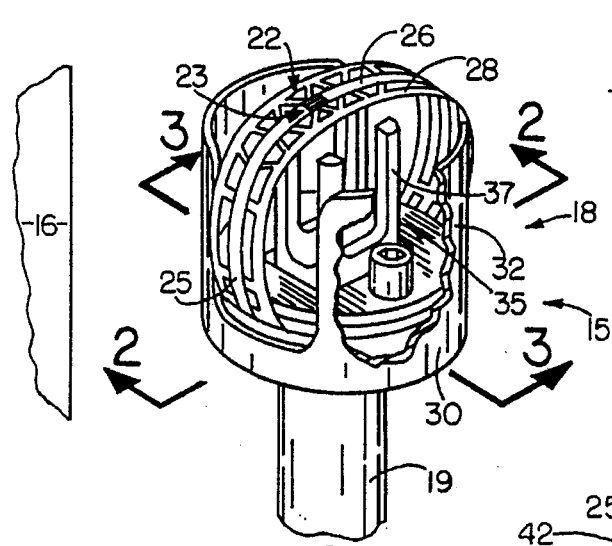
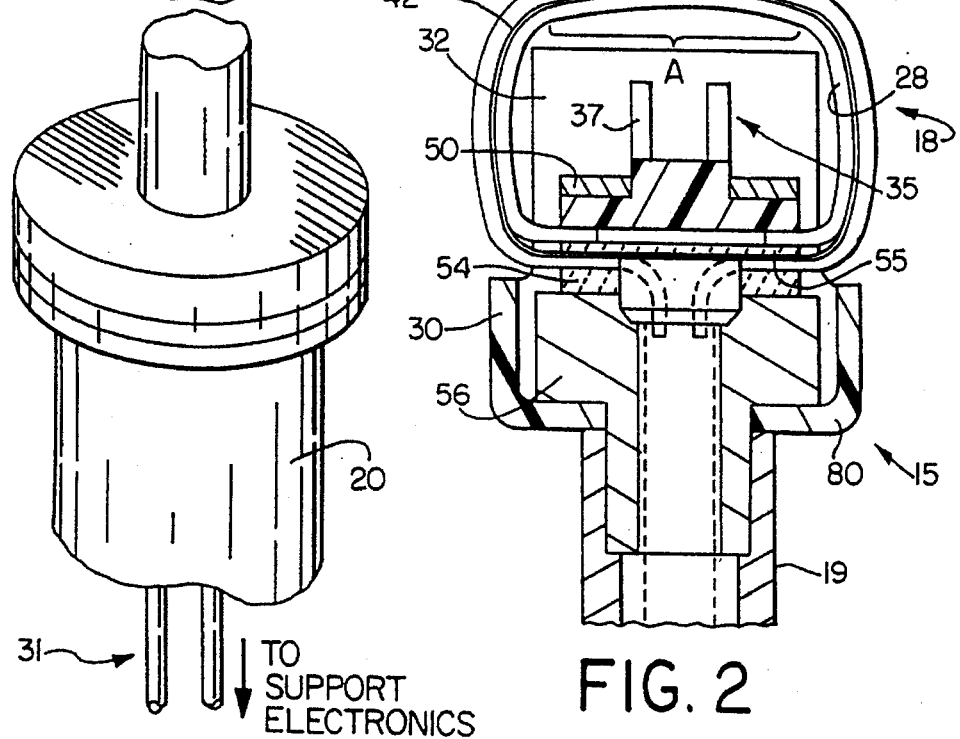
FIG. 1
FIG. 2

SURFACE TEMPERATURE PROBE WITH UNIFORM THERMOCOUPLE JUNCTION AND OVERTRAVEL PROTECTION

STATEMENT OF RELATED APPLICATION

This application is a continuation-in-part of U.S. patent application Ser. No. 08/073,850 filed on Jun. 8, 1993, now U.S. Pat. No. 5,370,459, the entire disclosure of which is incorporated herein by reference.

TECHNICAL FIELD

The present invention relates generally to a surface temperature probe, and more particularly to a contacting-type surface temperature probe having a generally uniform thermocouple junction and improved flexibility.

BACKGROUND OF THE INVENTION

Surface temperature probes are known in the art. Contacting-type surface temperature probes are designed to be brought into contact with a surface in order to measure the temperature of the surface. For example, U.S. Pat. No. 4,859,081 describes a surface temperature probe which includes a thin plate spring with a thermocouple junction on a central portion thereof. The plate spring is fixed at both its ends to a support member so that the plate spring projects semicircularly in side elevation to form a temperature sensing portion. The semicircular plate spring and thermocouple junction are brought into contact with the surface to be measured and are pressed lightly against the surface to flatten slightly the semicircular portion of the plate spring. As a result, part of the plate spring and the thermocouple junction are engaged closely in press contact with the surface to be measured.

U.S. Pat. No. 4,279,154 describes a similar probe which utilizes a pair of foil strips of thermocouple materials which are butted or partly overlapped at their one ends to form a thermocouple junction thereat. The foil strips are overlaid across a plate spring including resilient support strips which provide contact pressure relative to the surface to be measured.

There are several drawbacks associated with conventional contact-type surface temperature probes. For example, FIG. 8a of the present application shows a conventional lap joint 1 formed between two thermocouple materials 2 on a resilient support strip 4. The lap joint 1 forms the thermocouple junction 5 which is to be engaged in press contact with the surface to be measured. The lap joint 1 results in a non-uniformity 6 in the thermocouple junction which prevents the thermocouple junction 5 from engaging uniformly in press contact with the surface to be measured, thereby introducing measurement error.

FIG. 8b of the present application illustrates a thermocouple junction 5' formed using a conventional butt joint 8 between the end surfaces of the thermocouple materials 2. The butt joint 8 is typically formed using a butt welder, for example, whereby the end surfaces of the thermocouple materials 2 are welded together. A problem arises however in that the end surfaces of the thermocouple materials typically have a very small surface area, e.g., on the order of four thousandths of an inch by one sixteenth of an inch. During welding of the butt joint 8, sputtering, flash, etc. can occur, thereby producing undesirable buildup at the joint 8. For example, a non-uniformity such as a burr 10 or the like may form on the surface of the butt joint 8. The burr 10 can prevent the thermocouple junction 5' from engaging in proper uniform contact with the surface to be measured, again introducing measurement error. As a result, another manufacturing step is necessary in order to remove the burr 10. Thus, additional manufacturing time and expense is necessary.

Still another drawback associated with conventional surface temperature probes is the use of an electrical insulating layer between the thermocouple materials and the spring plate. In the past, surface temperature probes have included a ceramic insulating layer approximately 20 microns thick between the thermocouple materials and the spring plate. Unfortunately, the ceramic layer can exhibit the normal brittle bulk properties associated with ceramic. This results in a probe tip which is likely to have reduced flexibility and thus be susceptible to damage due to, for example, the plate spring becoming overflexed and the ceramic layer breaking.

Yet another problem associated with conventional surface temperature probes is inadequate protection against overtravel of the thermocouple junction and spring plate. For example, a user may apply too much force applying the probe to the surface to be measured. As a result, the spring plate may flatten too far so as to permanently bend and/or break the plate spring or thermocouple junction. Conventional probes such as that described in the above-mentioned '081 patent attempt to overcome such a problem by including semicircular housing walls which substantially encircle the resilient contact surface. The housing walls limit the distance the spring plate and thermocouple junction can be deflected when pressed against a surface. However, such housing walls are not effective in the event surfaces are contacted which are smaller than the diameter of the housing walls, as in the case of screw heads, etc., or if the plate spring is pushed with a finger, etc. As a result, conventional surface temperature probes are still subject to damage due to overtravel of the spring plate, etc.

Still another drawback of conventional surface temperature probes relates to the thermal properties of the spring plate. A spring plate which is generally solid has a relatively high thermal mass which can adversely affect temperature measurements. As an alternative, the above-mentioned '154 patent describes a probe which uses a spring plate consisting of a pair of relatively thin resilient strips having cross members therebetween. The thermocouple materials are positioned across the cross members. The spring plate tends to have a lower thermal mass. However, such a spring plate does not ensure as large a contact area as the solid spring plate to ensure good contact between the thermocouple junction and the surface being measured. The cross members provide support to the thermocouple junction only in small, localized areas.

In view of the aforementioned shortcomings associated with conventional contact-type surface temperature probes, there is a need in the art for a surface temperature probe and a method of making such having a uniform thermocouple junction, particularly without requiring additional processing steps to remove non-uniformities. Moreover, there is a need in the art for a surface temperature probe having a ceramic insulating layer which does not exhibit the normal brittle bulk properties of ceramic. There is also a need for a surface temperature probe which includes means for preventing overtravel of the spring plate and/or thermocouple junction, even in the event of contact with a relatively small surface. Finally, there is a need for a spring plate for a surface temperature probe which provides support for a large contact area while still having a low degree of thermal mass.

SUMMARY OF THE INVENTION

The present invention relates to a contact-type surface temperature probe which has a generally uniform thermocouple junction. The thermocouple junction is formed by electrically joining each of the thermocouple elements or materials directly to the spring plate (also referred to herein as a spring flexure). The spring flexure is electrically conductive so that the thermocouple materials are not joined directly to each other as in a lap or butt joint. As a result, the thermocouple junction of the present invention has a more uniform, smooth contour for better contact with the surface. Manufacturing steps to remove burrs or other non-uniformities become unnecessary.

The surface temperature probe of the present invention also includes a thin film ceramic coating or layer providing electrical insulation between the spring flexure and the thermocouple materials except where the respective materials are electrically joined to the spring flexure. The thin film ceramic coating is superior to that found in existing temperature probes at least in that it is more flexible and does not exhibit the normal brittle bulk properties of ceramic.

Furthermore, the temperature probe of the present invention includes one or more posts positioned inside the tip of the probe. The posts prevent the thermocouple junction/ spring flexure from traveling too far a distance so as to cause damage to the probe, even in the case of small surfaces. The temperature probe also includes a spring flexure which has, at least in part, a generally lattice-like structure such as a honeycomb design. The lattice-like structure is designed to contact the thermocouple materials over a larger area to ensure good contact between the thermocouple materials and the surface being measured. At the same time, the lattice-like structure represents a minimal thermal mass in the spring flexure.

According to one aspect of the present invention, a temperature probe is provided which includes a spring flexure for providing a spring force in relation to a surface to be measured, the spring flexure for undergoing deflection upon being pressed against at least one surface; and a stop toward which said spring flexure is deflected, wherein under normal operating conditions a space exists between said stop and said spring flexure, and said stop limits an amount of travel of said spring flexure to prevent damage to said temperature probe.

According to still another aspect of the present invention, a temperature probe is provided which includes a spring flexure for providing a spring force in relation to a surface to be measured, the spring flexure for undergoing deflection upon being pressed against the surface; and overtravel protection means towards which the spring flexure is deflected, wherein the overtravel protection means limits the amount of travel of the spring flexure to prevent damage to the temperature probe.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

FIG. 1 is a fragmentary view of one form of surface temperature probe in accordance with the present invention;

FIG. 2 is a cross-sectional view of the surface temperature probe of

FIG. 1 along lines 2—2 in accordance with the present invention;

FIG. 3 is an enlarged cross-sectional view of the surface temperature probe of FIG. 1 along lines 3—3 in accordance with the present invention;

DESCRIPTION OF THE PREFERRED EMBODIMENTS

Figure 4A:
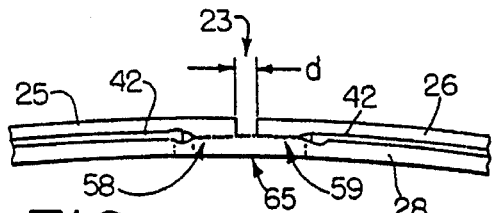
FIG. 4a is a schematic side view of a thermocouple junction with a thin film insulator layer and spring flexure in accordance with the present invention.

The surface temperature probe of the present invention will now be described with reference to the drawings, wherein like reference numerals refer to like elements throughout.

Figure 4B:
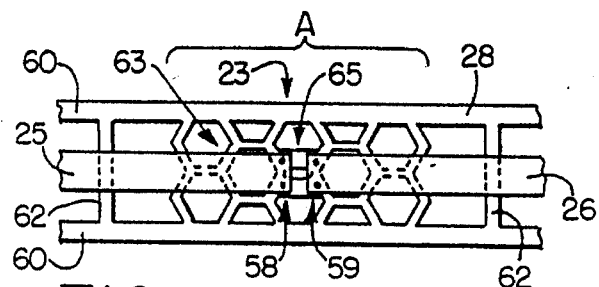
FIG. 4b is a partial top view of a thermocouple junction in accordance with the present invention.

Referring now to FIG. 1, a surface temperature probe 15 is shown for measuring the temperature of a surface 16. The temperature probe 15 includes a probe tip 18 mounted to one end of a shaft 19 having a handle 20 secured to the other end. The probe tip 18 includes a temperature sensing element 22 comprising a thermocouple junction 23. The thermocouple junction 23 is formed by an electrical connection between thermocouple materials 25 and 26. The thermocouple materials 25 and 26 are preferably metal ribbons mounted to a spring flexure 28. Each of the thermocouple materials 25 and 26 has an end which is electrically joined to a spring flexure 28 in the center portion of the spring flexure 28 to form the thermocouple junction 23 (FIGS. 4a and 4b). The opposite ends of the thermocouple materials 25 and 26 are secured within a housing 30 of the probe tip 18 as are the ends of the spring flexure 28. As a result, the thermocouple materials 25, 26 and the spring flexure 28 project semicircularly in side elevation as is shown in FIG. 2 such that the thermocouple junction 23 is located generally at the center of the arc. The non-joined ends of the thermocouple materials 25 and 26 are coupled via wires 31 or the like to provide connection to the appropriate support electronics (not shown) for the probe 15. The support electronics measure the actual temperature of the surface 16 using conventional thermocouple principles.

In use the thermocouple junction 23 is brought into heat and pressure contact with the surface 16. The spring flexure 28 adjacent the thermocouple junction 23 has a known degree of resiliency such that as the thermocouple junction 23 is brought into pressure contact with the surface 16, the thermocouple junction 23 and spring flexure 28 will tend to flatten. The spring flexure 28 thereby provides sufficient contact area and pressure between the thermocouple junction 23 and the surface 16.

A pair of laterally spaced semicircular walls 32 form part of the housing 30 between which the thermocouple materials 25 and 26 and spring flexure 28 are positioned. The height of the walls 32 relative to the base of the probe tip 18 is less than the highest part of the arcuate portion formed by the thermocouple junction 23 and spring flexure 28. Thus, when the thermocouple junction/spring flexure is pressed into contact with the surface 16, the thermocouple junction 23 and spring flexure 28 will undergo only a limited amount of deflection as the top of the walls 32 contact the surface 16.

The probe tip 18 includes a post assembly 35 which also prevents excessive deflection (i.e., overtravel) of the thermocouple junction 23 and spring flexure 28. The post assembly 35 is mounted in the base of the probe tip 18 between the walls 32 and includes a plurality of vertical projections or posts 37 (e.g., four). The posts 37 are made of a rigid material and are positioned directly beneath the spring flexure 28 and/or thermocouple junction 23 at a height equal to or less than that of the walls 32. As a result, even if the probe tip 18 is pressed into contact with a surface 16 which is smaller than the distance between the walls 32 (e.g., a surface such as a screw head, finger, etc.), the posts 37 will limit the amount of deflection of the thermocouple junction 23 and spring flexure 28.

In other words, as the spring flexure 28 is deflected in the direction indicated by arrow 40 in FIG. 2, the spring flexure 28 is deflected towards the tops of the posts 37. In the event the surface 16 is smaller than the distance between the walls 32, the spring flexure 28 will deflect only so far as to come into contact with the tops of the posts 37. The height of the posts 37 is preselected to prevent the spring flexure 28 and thermocouple junction 23 from deflecting too far so as to result in damage to the probe 15.

Referring to FIGS. 2 and 3, the details of the probe 15 are now described. The thermocouple materials 25 and 26 forming the thermocouple junction 23 are preferably ribbon materials made of thermocouple materials, respectively. For example, type K materials can be used to form the thermocouple. Moreover, other thermocouple materials such as type E, J, N and T materials can be used without departing from the scope of the invention. Exemplary dimensions for the ribbon-type thermocouple materials 25 and 26 are four thousandths of an inch thick by one sixteenth of an inch wide.

The spring flexure 28 is made of a resilient material such as Inconel (a trademark of Inco Alloys International) or stainless steel for example. The spring flexure 28 preferably is an electrically conductive material so as to provide an electrical connection between the thermocouple materials 25 and 26 as is described below with respect to FIG. 4a.

A thin film insulating layer 42 between the thermocouple materials 25 and 26 and the spring flexure 28 electrically insulates the thermocouple materials from the spring flexure 28, except for where the thermocouple materials are electrically joined to the spring flexure 28 as is described below with respect to FIG. 4a. By electrically isolating the thermocouple materials 25 and 26 except in the immediate area of the thermoconductive junction 23 at the center of the semicircular projection, more accurate temperature measurements can be obtained. Preferably the thin film layer 42 is a ceramic coating which is plasma vapor deposited, for example, on the top surface of the spring flexure 28 between the respective thermocouple material 25 or 26 and the spring flexure. Alternatively, the thin film ceramic coating can be deposited on the bottom surface of the respective thermocouple materials.

The thin film layer 42 preferably is made from a ceramic material such as alumina or zirconia. The thin film layer 42, if made of ceramic material, preferably has a thickness of approximately 13 microns or less. Ceramic layers having a thickness greater than approximately 13 microns begin to exhibit normal brittle bulk properties which can result in breakage of the temperature probe. Ideally, the thin film layer 42 is as thin as possible while still providing the desired electrical insulation. In the present invention, a ceramic thin film layer 42 having a thickness in the range of 0.1 to 10 microns is preferred, and a thickness in the range of 0.5 to 3 microns most preferred for giving optimum flexibility and insulation. Additional advantages of a ceramic thin film layer 42 as opposed to a thicker layer include reduced costs associated with less material expenses and reduced manufacturing time.

The post assembly 35 is secured to the probe tip 18 by a metal clamping plate 50 mounted to the housing 30 by screws 52 (FIG. 3). The post assembly 35 is preferably made of a rigid metal, ceramic or plastic material, the particular material depending on the temperatures at which the probe 15 is intended to be utilized. As previously mentioned, the post assembly 35 in the exemplary embodiment includes four separate vertical posts 37 each of which extends to a height equal to or less than the height of the walls 32. As shown in FIG. 3 in particular, the posts 37 are located directly beneath the spring flexure 28 such that the spring flexure 28 will deflect in the direction of arrow 40 towards the tops of the posts 37 upon being pressed into contact with the surface 16. The tops of the posts 37 will ultimately come into contact with the spring flexure 28 in the event the surface 16 is smaller than the diameter of the walls 32 and therefore limit the degree of travel of the spring flexure 28 and the thermocouple junction 23. Thus, regardless of whether the surface 16 is smaller than the diameter of the walls 32, the spring flexure 28 and thermocouple junction 23 are protected against overtravel.

It will be appreciated that the spring flexure 28 may itself be incorporated into the thermocouple materials 25 and 26 and not be a separate element. For example, the thermocouple materials 25 and 26 each may be made of a ribbon material or the like which itself has the desired degree of resiliency. This eliminates the need for a separate spring flexure 28 as shown. Nevertheless, the post assembly 35 of the present invention provides protection against over travel of the spring flexure 28 and thermocouple junction 23 regardless of whether the spring flexure is integral or discrete part in relation to the thermocouple materials.

The non-joined ends of the thermocouple materials 25 and 26 and the spring flexure 28 are secured in the housing 30 between the post assembly 35 and an insulating layer 54 of mica, silicone, fluorocarbon, or the like as shown in FIG. 2. The layer 54 is located on top of a support member 56 which, along with the post assembly 35, are stacked, clamped together, and securely held in the housing 30 by the clamping plate 50 and screws 52 (FIG. 3). The ends of the thermocouple materials 25 and 26 are connected to the wires 31 (FIG. 1) to provide connection to the support electronics in a conventional manner. Another insulating layer 55 made of mica, silicone or the like is included between the ends of the thermocouple materials 25 and 26 and the spring flexure 28 to provide additional isolation therebetween where clamping occurs.

FIG. 4a illustrates how the thermocouple materials 25 and 26 are joined to the spring flexure 28 in order to form the thermocouple junction 23 in accordance with the present invention. In the preferred embodiment, the thermocouple material 25 is joined at one end directly to the spring flexure 28 using, for example, spot welding, brazing, laser welding, etc., to form a joint 58 therebetween. In the area of the joint 58 there is no thin film layer 42 in order that the thermocouple material will be electrically connected to the spring flexure 28. Similarly, the thermocouple material 26 is joined directly to the spring flexure 28 using a spot weld or the like to form a joint 59.

Figure 8A:
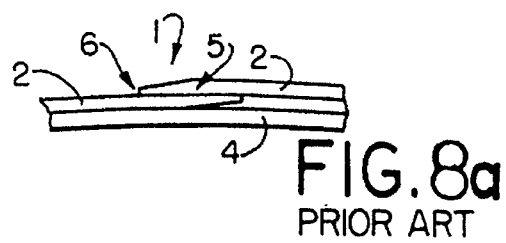
FIGS. 8a and 8b are schematic side views of conventional lapped and butted thermocouple junctions, respectively.
Figure 8B:
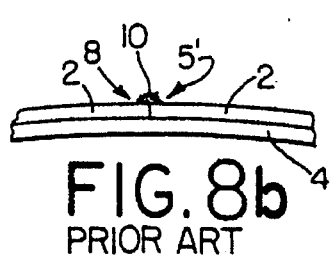

Since the spring flexure 28 is electrically conductive, there exists an electrical connection between the thermocouple materials 25 and 26 without physically forming the thermocouple material 25 directly to the thermocouple material 26. Therefore, the thermocouple junction 23 of the present invention does not have the type of non-uniformities associated with a lap joint as in FIG. 8a or a butt joint as in FIG. 8b. The temperature probe 15 does not require a butt weld between the small end surfaces of the thermocouple materials as in the past. As a result, the problems associated with flash, sputtering, etc. at the end surfaces are avoided. The present invention does not suffer from and avoids the formation of burrs and the like which must be removed from conventional butt joints and result in added expense and manufacturing steps. Moreover, the present invention does not require that the ends of the thermocouple materials 25 and 26 undergo the extensive preparation necessary to obtain the precision surfaces required for forming a butt weld joint between the ends as will be appreciated. It will also be appreciated that although FIG. 4a shows a distance "d" between the respective end surfaces of the thermocouple materials 25 and 26, the end surfaces still could physically contact each other. However, a butt weld still is not required because the electrical connection is provided via the spring flexure 28.

Referring now to FIG. 4b, a top view of the spring flexure 28 in the area of the thermocouple junction 23 is shown. For clarity, the thin film layer 42 has been omitted. According to a preferred embodiment of the invention, the spring flexure 28 includes a pair of parallel resilient members 60 connected by cross members 62. The thermocouple materials 25 and 26 are positioned in parallel between the resilient members 60 and are supported by the cross members 62.

The area labelled "A" identifies the desired contact area of the temperature probe 15. The spring flexure 28 in the area A centered about the thermocouple junction 23 includes a resilient lattice-like structure 63 between the resilient members 60. The lattice-like structure 63 is designed to contact the thermocouple materials 25 and 26 over a larger area as compared to conventional contact type probes. This ensures that there will be sufficient force exerted by the spring flexure 28 in the contact area A of the thermocouple junction 23 to provide sufficient contact between the thermocouple materials and the surface 16 being measured. At the same time, the thin webs of the lattice-like structure 63 minimize the thermal mass of the spring flexure 28. As a result, the temperature probe 15 can provide accurate measurements even in the case where the surface 16 has a relatively low thermal mass.

The center of the lattice-like structure 63 includes a pad 65 which serves as a surface area on the spring flexure 28 to which the ends of the thermocouple materials 25 and 26 are desirably welded or otherwise directly joined. For this reason the pad 65 preferably does not include the thin film insulating layer 42. The pad 65 itself can have different shapes and sizes, the object being to provide sufficient surface area to join the thermocouple materials to the pad 65. The spring flexure 28 may be chemically milled, laser machined, stamped, etc. from spring metal and coated, either before or after bending, if desired, as will be appreciated. As mentioned above, the thin film insulating layer 42 can be formed on the surface of the spring flexure 28 via plasma vapor deposition or the like. Masking can be used to prevent deposit of the thin film layer 42 on the pad 65. Alternatively, the entire surface of the spring flexure 28 can be coated initially via plasma vapor deposition or the like and the pad 65 then exposed using abrasive blasting to remove the deposit.

Figure 5A:
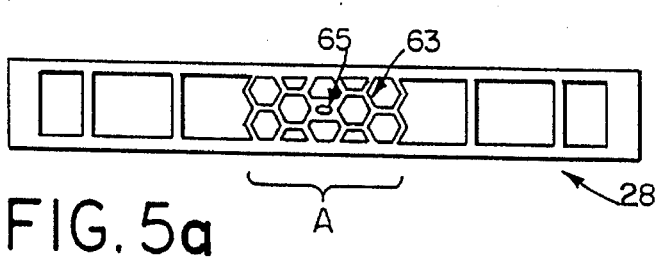
FIGS. 5a–5e are schematic top plan views of different embodiments of a spring flexure in accordance with the present invention.
Figure 5B:
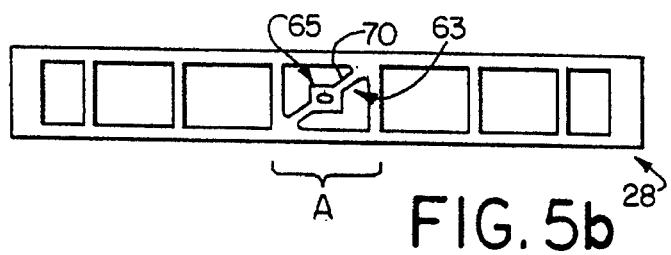
Figure 5C:
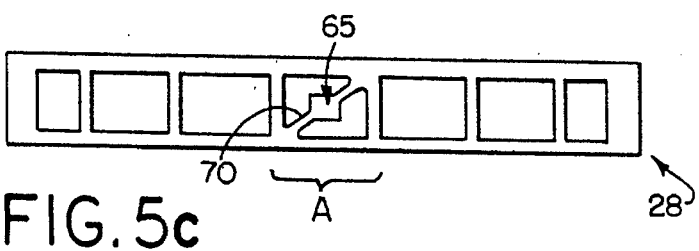
Figure 5D:
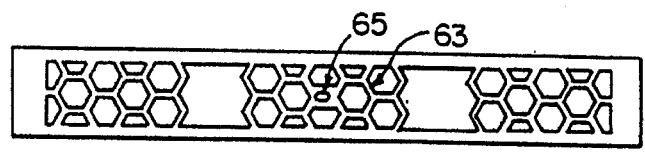
Figure 5E:
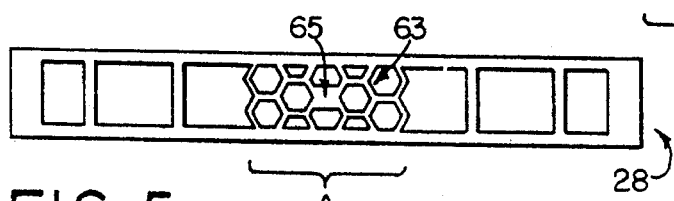

FIGS. 5a–5e show a number of additional embodiments of the spring flexure 28 in accordance with the present invention. Each embodiment includes a lattice-like structure 63 in the area A for providing good surface contact while still exhibiting relatively low temperature mass. FIGS. 5a, 5d and 5e illustrate a lattice-like structure having a preferred honeycomb design. FIG. 5d in particular includes a lattice-like structure near the ends of the spring flexure 28 to provide even further support. FIGS. 5b and 5c show a lattice-like structure having a diagonal member 70 for providing structural strength, good surface contact, and low temperature mass. Other designs for the lattice-like structure are also possible as will be appreciated in view of the present disclosure.

Figure 6A:
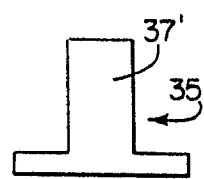
FIG. 6a is a side elevation view of another embodiment of a post assembly for providing overtravel protection in accordance with the present invention.

Referring now to FIG. 6a, another embodiment of the post assembly 35 is shown. In this embodiment, the post assembly comprises a single wide post 37' as opposed to the smaller four posts 37 shown in FIG. 1. The post 37' also protects against overtravel of the spring flexure 28. A disadvantage associated with the single wide post 37', however, is that at high temperatures the temperature radiation of the post 37' may affect temperature measurements. Therefore, a plurality of smaller posts 37 such as those in the embodiment of FIG. 1 are believed to provide superior high-temperature operation due to better thermal radiation characteristics, i.e., view factor, etc.

Consistent with the present invention, there are a variety of other configurations or structures for providing overtravel protection to the thermocouple junction and spring flexure. Generally speaking, the temperature probe of the present invention includes the provision of some type of mechanical stop which prevents flexure of the spring flexure to the point of damaging the probe. Most preferably, such overtravel protection has a minimal area, view factor, and emissivity so as to reduce and/or eliminate any adverse radiation effects on the accuracy of the temperature measurements due to interference with the thermocouple junction. This is accomplished in the preferred embodiments by way of one or more of a variety of projections, posts, cross-members, stubs, etc. which are positioned beneath the thermocouple junction in a direction towards which the spring flexure is deflected when applied to a surface. The projections, posts, cross-members, stubs, etc. help minimize the amount of material located proximate the thermocouple junction, while still providing protection against overtravel.

Figure 6B:
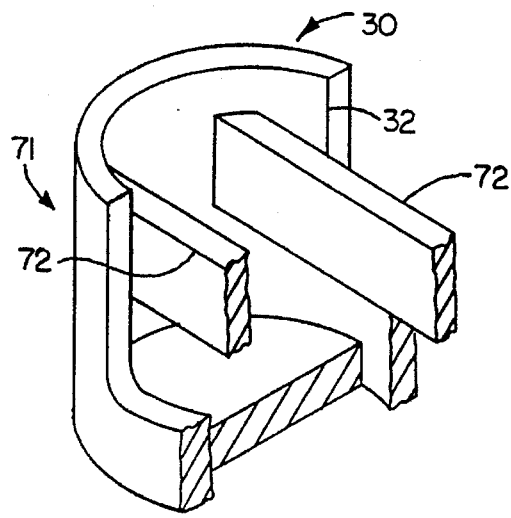
FIGS. 6b–6g are perspective views, partially broken away, of different embodiments of an assembly providing overtravel protection in accordance with the present invention.

For example, FIG. 6b illustrates in relevant part another embodiment of an assembly for preventing excessive deflection of the thermocouple junction 23 and spring flexure 28. The structure, generally designated 71, includes a pair of cross-members 72 integral with and/or secured to and spanning between the interior surface of the walls 32 of the housing 30. The cross-members 72 run generally parallel to one another and are positioned beneath the thermocouple junction 23 and spring flexure 28 (not shown). However, it should be realized that the cross-members 72 need not run generally parallel to function in their intended manner. For example, the cross-members 72 could converge on or diverge from one another. The cross-members 72 are preferably at a height equal to or less than that of the walls 32, and are offset relative to the thermocouple junction.

Figure 6C:
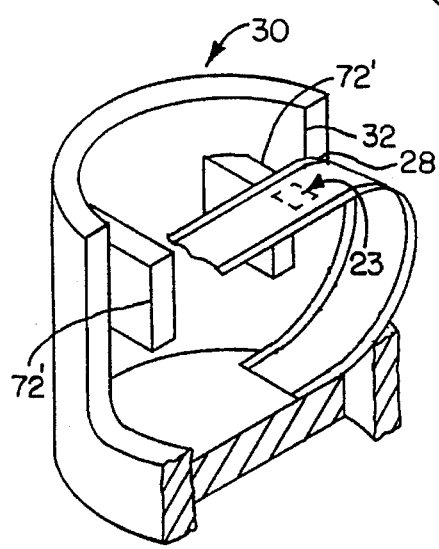

In another embodiment, the cross-member stubs 72' would not completely span the distance between the walls 32. Instead, cross-members 72' would extend from the walls 32 only so far as to be positioned underneath a portion of the spring flexure 28, leaving a gap underneath the thermocouple junction 23, as shown in part in FIG. 6c. This reduces the amount of material positioned proximate the thermocouple junction 23, thereby further reducing any thermal radiation effects on the thermocouple junction 23.

The cross-members 72, cross-member stubs 72', posts, or other means for preventing overtravel are generally made of a rigid material such as a rigid metal, ceramic, plastic or high durometer elastomer. Further, it is preferable to use materials having a relatively low emissivity for making the cross-members 72, etc. so as to minimize radiation losses of the thermocouple junction 23. For example, cross-members or cross-member stubs constructed of smooth plastic with a metallic plating offer relatively low emissivity as contemplated in the present invention. Emissivity is defined as the ratio of the radiation intensity of a non-blackbody to the radiation intensity of a blackbody. The lower the emissivity, the less radiation (heat) the body will emit or absorb. Accordingly, it is advantageous to use a material having a lower emissivity as such material will interfere less with the thermocouple junction 23. In other words, the temperature which is measured by the thermocouple junction 23 will have less radiation loss due to the means for overtravel protection when the means for overtravel protection is made from a material having a low emissivity.

In the preferred embodiment of the present invention for low temperature applications, the overtravel protection means, e.g., the cross-members 72 of FIG. 6b, would be made from molded plastic. Moreover, the overtravel protection means and housing 30 could be molded as a single piece such that the cross-members 72, etc., are integral with the housing 30. This reduces the manufacturing costs of the temperature probe as will be appreciated.

Figure 6D:
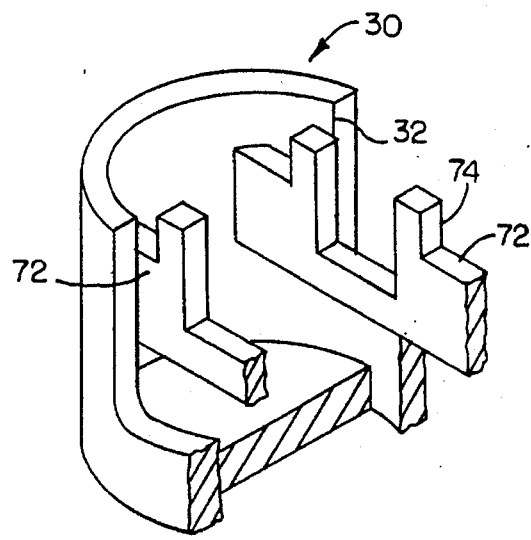

FIG. 6d shows yet another embodiment for preventing overtravel of the spring flexure. In FIG. 6d, the cross-members 72 further include a pair of upwardly extending posts 74 which are positioned at respective locations beneath the spring flexure 28. In this embodiment, the main body of the cross-members 72 is further removed from the area under the thermocouple junction 23 in order to achieve the better thermal radiation characteristics discussed above. The tops of the posts 74 function similarly to the posts 37 described in connection with the embodiment of FIG. 1.

Figure 6E:
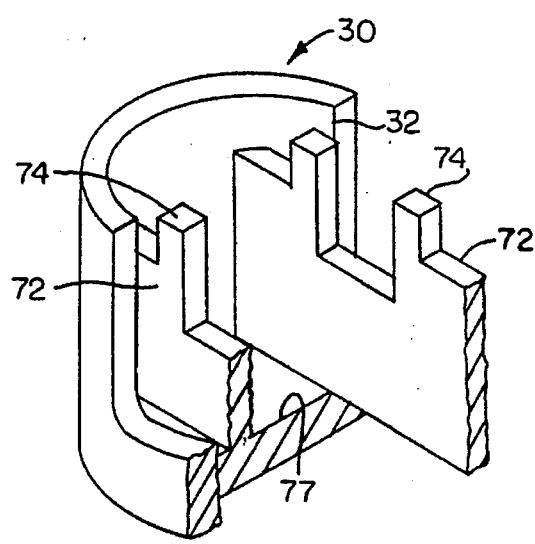

FIG. 6e illustrates still another embodiment for providing overtravel protection in which the cross-members 72 extend between the inner surface of the walls 32 of the housing 30 and are secured to and/or integral with the walls 32 of the housing 30 and the bottom 77 of the housing 30. The cross-members 72 again include posts 74 which extend upwardly beneath the spring flexure 28 as in the embodiment of FIG. 6d.

Figure 6F:
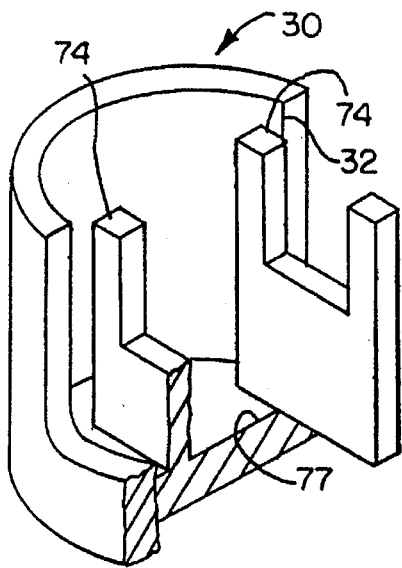

FIG. 6f illustrates an embodiment in which the posts 74 are secured only to the bottom 77 of the housing 30. Again, the amount of material near the thermocouple will be minimized.

Figure 6G:
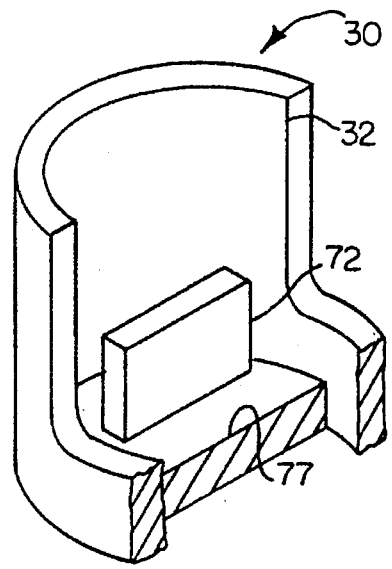

FIG. 6g illustrates an embodiment in which the cross-member 72 runs generally parallel to the spring flexure 28 as opposed to generally perpendicular as previously shown. As in the previous embodiments, the cross-member 72 could include posts 74 (not shown) which extend upwardly beneath the spring flexure 28, if desired.

The above embodiments illustrate but a few of the possible configurations for the overtravel protection means. It is obvious that other configurations will become apparent to one skilled in the art upon reading this specification. The present invention includes such other configurations.

Figure 7:
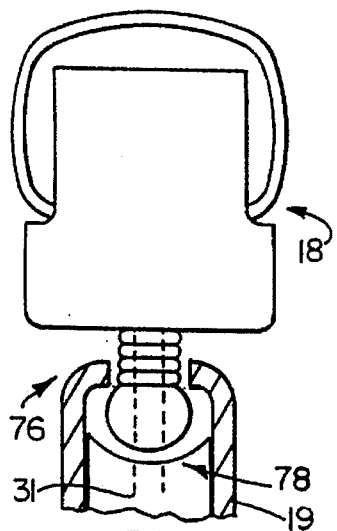
FIG. 7 is a partial schematic side view of a surface temperature probe having a pivoting tip in accordance with another embodiment of the present invention.

FIG. 7 illustrates another embodiment of the present invention in which the probe tip 18 is pivotably mounted to the shaft 19. More particularly, the probe tip 18 is attached to the shaft 19 via a ball and socket assembly 76. By pivotably mounting the probe tip 18 to the shaft 19, the temperature probe 15 can be used to measure surfaces which are difficult to access normally, are slanted, etc. A hole 78 in the ball and socket assembly 76 provides the wires 31 a path to the thermocouple materials 25 and 26.

Still another feature of the invention is shown with respect to FIGS. 2 and 3. The housing 30 with walls 32 and base portion 80 has a U-shaped cross-section. The height of the walls 32 is designated by "H", and the thickness of the walls 32 is designated "T". It has been found that a height-to-thickness ratio of twelve or more results in increased accuracy of the probe 15. By making the height to thickness ratio twelve or more, it is believed that there is better thermal isolation between the clamping materials in the probe tip 18, e.g., plate 50, layer 54, member 56, etc., and the surface 16 being measured. As a result, the effect that the probe 15 has on the temperature of the surface 16 is minimized.

Although the invention has been shown and described with respect to certain preferred embodiments, it is obvious that equivalents and modifications will occur to others skilled in the art upon the reading and understanding of the specification.

For example, the thin film insulating layer and overtravel protection features of the present invention have been described primarily in the context of a surface temperature probe using a thermocouple junction 23 as the temperature sensing element 22 adjacent the spring flexure. It will be appreciated, however, that these features have utility with surface temperature probes having a different type of temperature sensing elements adjacent the spring flexure in place of the thermocouple junction 23. For example, a different embodiment of the present invention will have a thermistor or a resistor temperature detector (RTD) as the temperature sensing element 22. The thin film insulating layer 42 between the thermistor/RTD and the spring flexure 28 provides electrical isolation therebetween while still avoiding the bulk properties of a non-thin film layer. Similarly, the post assembly 35 protects against overtravel of the spring flexure 28 in the case of a thermistor or RTD-type temperature sensing element as well as in the case of a thermocouple junction.

Furthermore, it is readily apparent that the overtravel protection means of the present invention could be employed in temperature probes which do not have a surrounding housing. In such case, the overtravel protection means can provide exclusive protection against overtravel in the absence of the walls 32. Rather than being fixed to the walls 32, the overtravel protection means may extend from the bottom of the probe tip, for example.

It will be further appreciated that although the spring flexure 28 is described herein as being a structure separate from the thermocouple junction, the spring flexure 28 can instead be formed by the thermocouple materials 25 and 26 themselves. For example, the thermocouple ribbon materials 25 and 26 themselves can exhibit flexure when applied against the surface. Thus, it is possible to have a temperature probe which involves only the spring flexure of the thermocouple materials 25 and 26 and does not include a separate spring flexure element. In such embodiment the overtravel protection of the present invention still provides protection against damage to the spring flexure made up by the thermocouple materials in the event of overtravel.

The present invention includes all such equivalents and modifications, and is limited only by the scope of the following claims.

What is claimed is:

1. A temperature probe comprising:

a spring flexure for providing a spring force in relation to a surface to be measured, said spring flexure undergoing deflection upon being pressed against said surface;

a temperature sensing element relative to said spring flexure; and at least one stop towards which said spring flexure is deflected;

wherein under normal operating conditions a space exists between said stop and said spring flexure, said stop limits an amount of travel of said spring flexure to prevent damage to said temperature probe, and a surface area of said stop adjacent said spring flexure is substantially reduced so as to help minimize thermal radiation effects on the temperature sensing element.

2. A temperature probe according to claim 1, further comprising a protective housing at least partially enclosing said spring flexure and said at least one stop.

3. A temperature probe according to claim 2, wherein said at least one stop is secured to said protective housing.

4. A temperature probe according to claim 3, wherein said at least one stop is made of plastic.

5. A temperature probe according to claim 2, wherein said at least one stop extends horizontally and is secured to at least one wall of said housing.

6. A temperature probe according to claim 2, wherein said at least one stop extends horizontally between and is secured to two walls of said housing.

7. A temperature probe according to claim 2, wherein said stop and said housing are integrally molded.

8. A temperature probe according to claim 1, wherein said at least one stop includes at least one post extending towards said spring flexure.

9. A temperature probe according to claim 1, wherein said at least one stop is also secured to a base of said housing.

10. A temperature probe according to claim 1, wherein said at least one stop includes a plurality of upwardly extending posts.

11. A temperature probe according to claim 1, wherein said at least one stop has relatively low emissivity.

12. A temperature probe according to claim 11, wherein the emissivity of said stop is approximately equal to the emissivity of smooth plastic with a metallic plating.

13. A temperature probe, comprising:

a spring flexure for providing a spring force in relation to a surface to be measured, said spring flexure undergoing deflection upon being pressed against said surface;

a temperature sensing element relative to said spring flexure; and overtravel protection means towards which said spring flexure is deflected;

wherein said overtravel protection means limits the amount of travel of said spring flexure to prevent damage to said temperature probe, and a surface area of said overtravel protection means adjacent said spring flexure is substantially reduced so as to help minimize thermal radiation effects on the temperature sensing element.

14. A temperature probe according to claim 13, wherein said overtravel protection means comprises a stop including at least one upwardly extending post which extends substantially into a curvature formed by the spring flexure.

15. A temperature probe according to claim 14, wherein said stop has relatively low emissivity.

16. A temperature probe according to claim 15, wherein the emissivity of said stop is approximately equal to the emissivity of smooth plastic with a metallic plating.

17. A temperature probe according to claim 13, wherein a thermocouple junction is formed by thermocouple materials on said spring flexure.

18. A temperature probe according to claim 13, wherein said spring flexure consists of thermocouple materials used as the temperature sensing element.

* * * * *